UNITED STATES PATENT OFFICE 3,798,266
Patented Mar. 19, 1974

3,798,266
PROCESS FOR PREPARING CITRIC ACID
Giorgio Bottaccio and Gian Paolo Chiusoli, Novara, Alfredo Coassolo, Vogogna, and Vittorio Carletti, Meda, Italy, assignors to Montecatini Edison S.p.A., Milan, Italy
No Drawing. Filed Sept. 18, 1972, Ser. No. 290,160
Claims priority, application Italy, Sept. 20, 1971, 28,832/71
Int. Cl. C07c 59/16
U.S. Cl. 260—535 P      16 Claims

ABSTRACT OF THE DISCLOSURE

A process for preparing citric acid, comprising carboxylating acetone with carbon dioxide in an inert dipolar aprotic medium, selected from the group consisting of N-dialkyl-substituted amides of organic acids, N-alkyl-lactams having up to 10 carbon atoms, and dimethyl sulphoxide, in the presence of at least 4 moles of phenol alkaline salts per each mole of acetone, at a temperature between 0° and 60° C. and at a substantially atmospheric pressure, to yield a 3-ketoglutaric acid alkaline salt. Cyanurating said 3-ketoglutaric acid alkaline salt with HCN in excess with respect to the theoretical amount necessary to obtain the cyanohydrin of the 3-ketoglutaric acid, at a temperature ranging from 0° to 10° C. Subsequently hydrolyzing the cyanohydrin thus obtained with sulphuric acid in excess with respect to the present alkali and nitrogen to yield citric acid. Recovering the citric acid as an alkaline earth metal salt.

This invention relates to a process for synthesizing citric acid from acetone.

Citric acid is a well known product with several important industrial uses. For instance, it is used in the foodstuffs industry, in the textile industry, in the alkyd resins field etc.

Citric acid is obtained, generally, either by fermentation of various substrates, e.g. sugar solutions, by suitable microorganisms, or from lemon juice. Nevertheless, both of the above-mentioned processes present some drawbacks. The fermentation method involves the utilization of equipment requiring vast surfaces, with the concomitant economic and practical burdens, besides the prompt availability of sugar solutions and selection of the microorganism stocks. On the other hand, the employment of lemon juice as the starting material is particularly expensive.

An object of the present invention therefore is to provide a process for preparing citric acid, which is free from all the drawbacks of the known processes.

This and other objects, which will be more clearly described hereinbelow, are achieved, according to this invention, through a process for the preparation of citric acid which in general includes a dicarboxylation reaction of acetone so as to obtain 3-ketoglutaric acid. The carboxylation reaction is carried out in an aprotic dipolar solvent in the presence of phenates of alkaline metals. At the end of the reaction, the alkaline salt of the 3-ketoglutaric acid is obtained. This salt is then subjected to a cyanuration reaction with hydrocyanic acid in order to convert the 3-ketoglutaric acid into the corresponding cyanohydrin. The cyanohydrin is finally hydrolyzed with $H_2SO_4$ to citric acid.

The process can be schematically represented by the following equations:

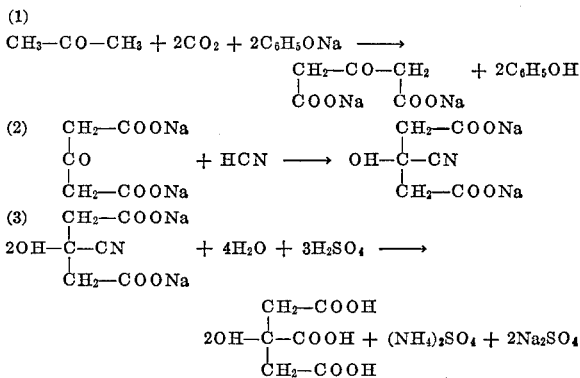

During the dicarboxylation reaction of acetone to obtain 3-ketoglutaric acid, minor amounts of acetoacetic acid are formed as a result of a monocarboxylation reaction.

Surprisingly, in the citric acid preparation process according to this invention, the presence of acetoacetic acid along with 3-ketoglutaric acid does not negatively affect the further trend of the process. In fact, the acetoacetic acid yields during the cyanuration reaction the respective cyanohydrin, which is subsequently hydrolyzed to citramalic acid.

Consequently, at the end of the process, the citric acid is mixed with a small quantity of citramalic acid derived from acetoacetic acid through a series of reactions analogous to those involved in the conversion of 3-ketoglutaric acid into cirtic acid. It has furthermore been found that the citramalic acid can be separated readily from the citric acid by precipitation of the relevant salts of alkaline earth metals.

It is preferable not to separate the alkaline salt of the acetoacetic acid from that of the 3-ketoglutaric acid, but to carry out the cyanuration and the subsequent hydrolysis on the mixtures of the salts and of the two resulting cyanohydrins and, at the end of the process, to separate the citramalic acid from the citric acid by the above-mentioned precipitation of the alkaline earth metal salts.

In particular, the process for preparing citric acid, according to this invention, is characterized in that acetone is made to react with carbon dioxide, in an aprotic dipolar inert medium selected from the group consisting of N-dialkyl-substituted amides of organic acids, N-alkyl-lactams, having up to 10 carbon atoms, and dimethyl sulphoxide, in the presence of at least 4 moles of alkaline salts (Na, K) of phenol per each mole of acetone, at a temperature from 0° to 60° C. and at a substantially atmospheric pressure. The thus obtained reaction mass is diluted with water and the aprotic solvent and the phenol are extracted subsequently with a solvent. The resulting aqueous mixture, substantially containing the alkaline salts of the 3-ketoglutaric acid and, in a smaller amount, of the acetoacetic acid, alkaline bicarbonates and carbonates, is cyanurated with HCN, in excess with respect to the theoretical amount necessary to obtain the cyanohydrins, at a temperature between 0° and 10° C., and then hydrolyzed with $H_2SO_4$, in excess with respect to the present alkali and nitrogen. Finally, the citric acid is recovered from the resulting reaction mass by separating the citric acid from the citramalic acid, present as a by-product, through selective precipitation as a salt of an alkaline earth metal.

Carboxylation (Equation 1) is carried out at a temperature between 0° and 60° C., preferably between 20° and 30° C. When operating at temperatures above 60° C., by-products, such as salicylic acid, are formed in more or less considerable quantities.

The reaction occurs over a period of time of about 2-4 hours. Alkaline phenates selected from between those of sodium and potassium, can be employed. Sodium phenate is preferred, however, due to obvious economic reasons.

The alkaline phenate is admixed to the solvent in amounts of 0.2-3 moles per liter of solvent, and preferably of 1 to 2 moles per liter. The alkaline phenate is added in variable amounts to the solvent according to the nature of the solvent itself. For instance, the optimum value in dimethylformamide is between 1 and 2 moles per each liter of solvent.

The higher concentration limit is not critical since higher concentrations are possible if the equipment employed allows treating more or less pasty mixtures, as it may occur with high concentrations of phenate.

The alkaline phenate/acetone molar ratio must be at least equal to 4, thus ensuring a transformation ratio of acetone into 3-ketoglutaric acid preferential with respect to acetoacetic acid; higher values are possible but not interesting from an economic viewpoint. The selectivity of the carboxylation reaction of acetone to 3-ketoglutaric acid amounts to 90% under the conditions described hereinbefore.

Aprotic dipolar solvents such as, for instance, N-dialkyl-substituted amides of organic acids and N-alkyl lactams having up to 10 carbon atoms, or dimethylsulphoxide, are particularly suitable as solvents. Particularly advantageous results are attained, however, by employing dimethylformamide, and N-methyl-pyrrolidone. The water content in the solvent shall be preferably kept within approximately 0.1% by weight. The solvent and the phenol, recovered by extraction with a proper solvent, for instance $CH_2Cl_2$, can be recycled according to known techniques.

The cyanuration (Equation 2) of the aqueous solution, containing the alkaline salts of the 3-ketoglutaric acid and in a smaller quantity, of the acetoacetic acid, is carried out with gaseous or liquid HCN, in excess of about 20% by weight with respect to the theoretical quantity necessary to obtain the corresponding cyanohydrins from the above-mentioned mixture of salts, at a temperature ranging from 0° to 10° C. This operation takes place, under continuous stirring, over a period of time of about 2-4 hours. The stirring is continued for almost an additional 1-2 hours.

Higher conversions are obtained in the cyanuration reaction if carried out in concentrated aqueous solutions. Hence it is preferred to operate with concentrations of the alkaline salt of 3-ketoglutaric acid higher than 10% with respect to water. Therefore, the addition of water after the carboxylation step, should be limited preferably to the amount strictly necessary.

In fact, it is possible to operate with high concentrations of the reactants or even in the presence of a suspension of them.

The hydrolysis (Equation 3) is carried out by employing $H_2SO_4$, even concentrated, to prevent further dilution, in excess of about 20% by weight, with respect to the alkali and nitrogen present, which are converted into alkaline and ammonium sulphates respectively, under reflux for a period of about 4-5 hours. Obviously, while sulphuric acid is being added, $CO_2$ develops from the present bicarbonates and carbonates. This $CO_2$ can be suitably recovered according to the known techniques for the best profitability of the process.

At the end of the hydrolysis reaction, the aqueous sulphuric solution contains, besides alkaline and ammonium sulphates, citric acid and minor amounts of citramalic acid. The citric acid can be separated from the citramalic acid by selective precipitation of the citric acid as a salt of alkaline earth metals, preferably as a salt of Ba, Cd, Ca. For example, by using calcium oxide it is possible to obtain the contemporaneous precipitation of the $SO_4^=$ ion present and of the citric acid respectively as calcium sulphate and calcium citrate, while the citramalic acid and/or its salts remain in solution.

Citric acid is recovered, according to known techniques, from the mixture of calcium salts. The product obtained can be finally purified by successive recrystallizations from water etc. The precipitation of the alkaline earth metal salt is preferably carried out at approximately 70–80° C.

The process of the invention is preferably practised as follows: The alkaline phenate, the solvent and the $CO_2$ are introduced, under stirring, into a reactor previously purged of air. A temperature of about 24°-26° C. is kept during the $CO_2$ absorption, for approximately 1 hour. Acetone, at the end of the $CO_2$ absorption, is admixed under continuous stirring at the same temperature for approximately an additional 2-3 hours. The reaction mass is then diluted with the minimum possible quantity of water. The unreacted acetone, the phenol and the solvent, are extracted with a solvent, for instance with methylene chloride. The unreacted acetone, the phenol and the solvent are recovered and recycled. HCN, in excess as described hereinbefore, is gradually added (in about 2-3 hours) into the aqueous layer, containing the alkaline salts of the 3-ketoglutaric acid and, in a smaller quantity, of the acetoacetic acid, at a temperature between 0 and 5° C. The stirring is continued for approximately 1 additional hour. Hydrolysis is then carried out with concentrated $H_2SO_4$ in excess, as mentioned hereinabove, by heating at reflux for approximately 4 hours. The thus obtained sulphuric solution is then admixed with the alkaline earth metal compound, as calcium oxide, and the precipitate (calcium citrate and calcium sulphate) is filtered off. The citric acid is finally recovered from the precipitate according to conventional techniques.

Because of the mild operating conditions, the process is particularly advantageous. A further advantage is in the utilization of acetone as an easily available and inexpensive starting material.

The following examples are given for mere illustrating purposes of the present invention.

EXAMPLE 1

42 g. of sodium phenate and 250 cc. of dimethylformamide were introduced, after air removal, into a five-neck flask having a 1 liter capacity, provided with stirrer, thermometer, dropping funnel and carbon dioxide inlet pipe. During the carbon dioxide absorption (about 1 hour), a temperature of 24°-26° C. was maintained. 5.3 g. of acetone were then admixed. The whole was stirred at the same temperature for further approximately 3 hours. 300 cc. of water were successively added, and unreacted acetone, phenol and dimethylformamide then extracted with methylene chloride (20 times with 50 cc.).

The aqueous layer contained about 9.5 g. of 3-ketoglutaric acid and 0.8 g. acetoacetic acid in the form of the respective sodium salts. These values were determined according to the colorimetric method.

The solution was then introduced into a five-neck flask having 1 liter capacity, provided with stirrer, thermometer, and dropping funnel.

Keeping the temperature between 0° and 5° C., 2.36 g. (3.4 cc.) of HCN were made to drip into the flask in about 2 hours and 30 minutes. Upon completion of the dripping, stirring was continued at this temperature for about 1 additional hour.

13 cc. of concentrated $H_2SO_4$ were added and the whole was heated at reflux for 4 hours.

The sulphuric solution thus obtained, containing citric acid and minor amounts of citramalic acid, was divided into two portions from which the citric acid was precipitated separately. $Cd(OH)_2$ was added to one portion, causing cadmium citrate to precipitate. After filtration, the solid suspended in water was treated with a strong cationic resin. The resin was then filtered off and the residue evaporated to dryness. The solid residue consisting of anhydrous citric acid almost completely free from citramalic acid, weighed 4.25 g. The filtrate contained citramalic acid (about 0.9 g.).

Calcium oxide was added, until neutrality at 70–80° C., to the second portion causing tricalcium citrate and calcium sulphate to precipitate. Filtration was carried out. The water suspended solid residue was treated with as much concentrated $H_2SO_4$ as necessary to liberate the citric acid. After separation of the calcium sulphate, according to conventional methods, 4.0 g. of anhydrous citric acid containing traces of citramalic acid (less than 1%) were obtained.

EXAMPLE 2

21 g. of sodium phenate in 125 cc. of N-methyl-2-pyrrolidone were introduced into equipment identical with that employed in Example 1.

The whole was stirred in a carbon dioxide atmosphere for about 1 hour at a temperature between 24 and 26° C. Subsequently, 2.65 g. of acetone were admixed, under stirring for 3 hours at approximately 25° C.

By operating under the same conditions as in Example 1, an aqueous solution containing 4.8 g. of 3-ketoglutaric acid and 0.6 g. of acetoacetic acid in the form of their sodium salts was obtained.

This solution was then cyanurated and hydrolyzed thus obtaining, by precipitation with CaO and subsequent treatment of the tricalcium sulphate obtained, as in Example 1, a yield of 4.3 g. of anhydrous citric acid (about 0.6 g. of citramalic acid remained in solution).

We claim:
1. A process for preparing citric acid, which comprises carboxylating acetone with carbon dioxide in an inert dipolar aprotic medium, selected from the group consisting of N-dialkyl-substituted amides of organic acids, N-alkyl-lactams having up to 10 carbon atoms, and dimethyl sulphoxide, in the presence of at least 4 moles of phenol alkaline salts per each mole of acetone, at a temperature between 0° and 60° C. and a substantially atmospheric pressure, to yield a 3-ketoglutaric acid alkaline salt, cyanurating said 3-ketoglutaric acid alkaline salt with HCN in excess with respect to the theoretical amount necessary to obtain the cyanohydrin of the 3-ketoglutaric acid, at a temperature ranging from 0° to 10° C., subsequently hydrolyzing the cyano hydrin thus obtained with sulphuric acid in excess with respect to the present alkali and nitrogen to yield citric acid and recovering said citric acid as an alkaline earth metal salt.

2. The process for preparing citric acid of claim 1, wherein the reaction mass obtained after reaction of acetone with carbon dioxide in an inert dipolar aprotic medium, selected from the group consisting of N-dialkyl-substituted amides of organic acids, N-alkyl-lactams, having up to 10 carbon atoms and dimethyl sulphoxide, in the presence of at least 4 moles of phenol alkaline salts per each mole of acetone, at a temperature comprised between 0° and 60° C. and at a substantially atmospheric pressure is diluted with water, and the solvent and the phenol are extracted; cyanurating the aqueous mixture resulting therefrom, containing substantially the alkaline salts of 3-ketoglutaric acid and, in a smaller quantity, of acetoacetic acid, alkaline carbonate and bicarbonate, with HCN in excess with respect to the theoretical amount necessary to obtain cyanohydrins from the mixture of the 3-ketoglutaric acid and acetoacetic acid at a temperature ranging from 0° to 10° C., and then hydrolyzing said cyanohydrin with $H_2SO_4$ in excess with respect to the present alkali and nitrogen, and finally recovering, from the resulting reaction mass, the citric acid by selective precipitation by separating said citric acid from the citramalic acid, present as a by-product, as an alkaline earth metal salt.

3. The process of claim 1, wherein alkaline phenate is selected from between the sodium and potassium phenates.

4. The process of claim 1, wherein the carboxylation reaction is carried out at a temperature from 20° to 30° C.

5. The process of claim 1, wherein the alkaline phenate is employed in concentrations with respect to the solvent of at least 0.2 moles of phenate per each liter of solvent.

6. The process of claim 1, wherein the alkaline phenate is employed in concentrations with respect to the solvent of from 1 to 2 moles per each liter of solvent.

7. The process of claim 1, wherein the solvent employed is dimethylformamide.

8. The process of claim 1, wherein the solvent employed is N-methyl-pyrrolidone.

9. The process of claim 1, characterized in that the water content of the inert dipolar aprotic medium is kept within a value of 0.1% by weight.

10. The process of claim 1, characterized in that both the inert dipolar aprotic medium and phenol are extracted with $CH_2Cl_2$ from the carboxylated mass.

11. The process of claim 1, wherein HCN is employed in an excess by weight of about 20% with respect to the theoretical amount required to obtain cyanohydrins from the mixture of the alkaline salts of the 3-ketoglutaric acid and of the acetoacetic acid.

12. The process of claim 11, wherein the cyanuration is carried out on a reaction mass having a concentration higher than 10% in the alkaline salt of the 3-ketoglutaric acid with respect to the aqueous solvent.

13. The process of claim 2, wherein the cyanuration is carried out on the reaction mass suspended in an aqueous solvent.

14. The process of claim 2, wherein the hydrolysis is preferably carried out with concentrated $H_2SO_4$ in an excess by weight of about 20% with respect to the present alkali and nitrogen.

15. The process of claim 1, wherein citric acid is separated from the citramalic acid, contained as a by-product in the reaction mass, by selective precipitation of the salt of an alkaline earth metal, selected from the group consisting of calcium, barium and cadmium.

16. The process of claim 1, wherein citric acid is separated from the citramalic acid, present as a by-product in the reaction mass, by selective precipitation of the citric acid, along with the present $SO_4^=$ ion, with calcium salts, and recovering the citric acid from the calcium citrate produced.

References Cited
UNITED STATES PATENTS
3,318,944   5/1967   Wiley _____ 260—535 P
FOREIGN PATENTS
1,145,098   3/1969   Great Britain _____ 260—537 R LORRAINE A. WEINBERGER, Primary Examiner P. J. KILLOS, Assistant Examiner U.S. Cl. X.R.

260—465.4, 521 R, 526 R, 537 R